US009321346B2

(12) United States Patent
Shipp

(10) Patent No.: US 9,321,346 B2
(45) Date of Patent: Apr. 26, 2016

(54) TRUCK FUEL TANK SYSTEM FOR IMPROVED CRASHWORTHINESS

(71) Applicant: Erin Marie Shipp, Charleston, SC (US)

(72) Inventor: Erin Marie Shipp, Charleston, SC (US)

( * ) Notice: Subject to any disclaimer, the term of this patent is extended or adjusted under 35 U.S.C. 154(b) by 0 days.

(21) Appl. No.: 14/149,957

(22) Filed: Jan. 8, 2014

(65) Prior Publication Data
US 2014/0191498 A1 Jul. 10, 2014

Related U.S. Application Data

(60) Provisional application No. 61/750,418, filed on Jan. 9, 2013.

(51) Int. Cl.
*B60K 15/067* (2006.01)
*B60K 15/073* (2006.01)
*B60K 15/07* (2006.01)
*B60K 15/063* (2006.01)
*B60K 15/03* (2006.01)

(52) U.S. Cl.
CPC ............. *B60K 15/067* (2013.01); *B60K 15/063* (2013.01); *B60K 15/07* (2013.01); *B60K 15/073* (2013.01); *B60K 2015/03407* (2013.01); *B60K 2015/0634* (2013.01); *B60K 2015/0675* (2013.01); *B60Y 2200/14* (2013.01); *B60Y 2200/221* (2013.01); *B60Y 2306/01* (2013.01)

(58) Field of Classification Search
CPC ...... B60K 15/00; B60K 15/03; B60K 15/063; B60K 15/0634; B60K 15/067; B60K 15/0675; B60K 2015/03407; B60K 2015/03453
See application file for complete search history.

(56) References Cited

U.S. PATENT DOCUMENTS

| 1,148,842 | A | * | 8/1915 | Huff | 280/834 |
| 1,760,457 | A | * | 5/1930 | Walker | 280/830 |
| 2,276,963 | A | | 3/1942 | Griffin | |
| 2,465,173 | A | | 3/1949 | Scales et al. | |
| 2,622,887 | A | * | 12/1952 | Prior | 280/833 |
| 3,227,410 | A | | 1/1966 | McCuen | |
| 3,511,515 | A | * | 5/1970 | Parkinson et al. | 280/830 |
| 3,552,596 | A | | 1/1971 | Landon | |
| 4,371,181 | A | * | 2/1983 | Monigold et al. | 280/834 |
| 4,444,373 | A | * | 4/1984 | Hayashi | 248/544 |
| 4,610,453 | A | | 9/1986 | Collier | |

(Continued)

FOREIGN PATENT DOCUMENTS

| CA | 2553752 A1 * | 7/2005 | ............... B60K 8/00 |
| DE | 3722034 C1 * | 9/1988 | ............. B60K 15/02 |

(Continued)

*Primary Examiner* — Joseph Rocca
*Assistant Examiner* — Maurice Williams
(74) *Attorney, Agent, or Firm* — McNees Wallace & Nurick LLC

(57) ABSTRACT

A revised location for the fuel system and fuel tanks to improve crashworthiness and reduce the occurrence of tank failure, fuel spillage, fire and/or explosion while still providing a sufficient range for the vehicle. The fuel tank system includes at least one fuel tank and a support structure. The at least one fuel tank is provided proximate frame rail members of the truck. At least a portion of the at least one fuel tank extends between an extension of a vertical axis of each of the frame rail members. The support structure protects the at least one fuel tank during an event, such as, but not limited to a collision, crash or accident. The support structure includes at least one mounting member which attaches the at least one fuel tank to the frame rail members, rails which extend about the at least one fuel tank, and at least one bottom plate.

28 Claims, 8 Drawing Sheets

(56) References Cited

U.S. PATENT DOCUMENTS

| | | | |
|---|---|---|---|
| 4,621,822 A * | 11/1986 | Knochelmann et al. | 280/834 |
| 4,723,810 A * | 2/1988 | Kanemaru et al. | 296/203.02 |
| 5,380,042 A | 1/1995 | Hively et al. | |
| 5,496,069 A * | 3/1996 | Milligan | 280/830 |
| 5,556,133 A * | 9/1996 | Oku et al. | 280/781 |
| 5,673,940 A | 10/1997 | Gaisford et al. | |
| 5,762,145 A | 6/1998 | Bennett | |
| 6,059,252 A | 5/2000 | Emmann et al. | |
| 6,099,042 A * | 8/2000 | Cook et al. | 280/834 |
| 6,109,290 A * | 8/2000 | Sabatinelli | 137/234.6 |
| 6,692,028 B2 * | 2/2004 | Koster | 280/830 |
| 6,905,164 B2 | 6/2005 | Marrs et al. | |
| 7,264,277 B2 * | 9/2007 | Ono et al. | 280/830 |
| 7,631,901 B2 * | 12/2009 | Diehl | 280/834 |
| 7,641,254 B2 | 1/2010 | Stegawski et al. | |
| 7,819,431 B2 * | 10/2010 | Minami | 280/834 |
| 7,913,788 B1 * | 3/2011 | Bryer et al. | 180/68.5 |
| 8,579,331 B2 * | 11/2013 | Hayashi et al. | 280/834 |
| 2006/0061081 A1 * | 3/2006 | Kresse et al. | 280/834 |
| 2008/0017430 A1 * | 1/2008 | Marsala et al. | 180/69.1 |
| 2010/0276165 A1 | 11/2010 | Hobson et al. | |
| 2013/0264347 A1 * | 10/2013 | Fujita | 220/562 |

FOREIGN PATENT DOCUMENTS

| | | | | |
|---|---|---|---|---|
| DE | 4018197 A1 * | 12/1991 | | B60K 15/067 |
| DE | 19820338 * | 11/1999 | | B60K 15/063 |
| DE | 102009039469 * | 3/2011 | | B62D 25/20 |
| DE | 202012103321 U1 | 9/2012 | | |
| DE | 102011117331 A1 * | 5/2013 | | B60K 15/03 |
| DE | 102012023154 A1 * | 8/2013 | | F16L 3/14 |
| EP | 1510393 A1 | 3/2005 | | |
| EP | 1564058 A1 * | 8/2005 | | B60K 15/067 |
| FR | 1476592 A * | 4/1967 | | |
| FR | 2785576 A1 * | 5/2000 | | B60K 15/067 |
| FR | 2957888 A1 | 9/2011 | | |
| GB | 2120987 A | 12/1983 | | |
| WO | WO 2011052661 A1 * | 5/2011 | | F16B 19/10 |

* cited by examiner

TRUCK FUEL TANK SYSTEM FOR IMPROVED CRASHWORTHINESS

FIELD OF THE INVENTION

The present invention is directed to a fuel system and fuel tanks for heavy duty trucks, and more particularly to protecting the fuel tanks and fuel system during a crash.

BACKGROUND OF THE INVENTION

It is generally known that in configuring a motor vehicle with a fuel tank, it is important to prevent the fuel tank from damage and spillage during the crash. There are several strategies that have been employed in automotive design to meet those desires and requirements.

Those strategies include, but are not limited to, placing the fuel tank away from the perimeter of the vehicle, ensuring crush space is provided to absorb crash energy before the fuel tank is affected, constructing the fuel tank of materials that are not easily cut or torn, applying shields in areas of the fuel tank that may be vulnerable, routing all supply lines in protected areas, and providing the filler with a check valve to prevent leakage.

Automobiles and light trucks must pass standards for fuel tank leakage in all mandated crash tests that range from frontal impacts, to side impacts to rear impacts. However, heavy trucks other than school buses have no federal requirements for crashworthiness of the fuel system.

Currently most manufacturers of heavy trucks mount thin wall aluminum or steel tanks to the outside of the frame rails for carrying fuel. Due to the location and construction of the fuel tanks in heavy trucks, the tank is exposed to crushing during various crash events, resulting in an increased possibility of fuel spillage, fire and explosion. These risks are a known hazard in fuel storage areas or vehicles, and are considered significant if there is an accident causing an object, such as, but not limited to, debris from an accident or the guide rail, to penetrate the fuel tank. Rupturing of fuel tanks is believed to be a common reason for fires or explosions.

It would be desirable to provide a truck fuel tank system which overcomes the problems stated above. It would also be desirable to provide for revised placement and protection for the fuel tanks and fuel system, thereby improving crashworthiness and reducing the occurrence of tank failure, fuel spillage, fire and/or explosion.

SUMMARY OF THE INVENTION

The invention provides a revised location for the fuel system and fuel tanks to improve crashworthiness and reduce the occurrence of tank failure, fuel spillage, fire and/or explosion while still providing a sufficient range for the vehicle. The fuel tanks are protected from damage from the side, bottom and between the tanks.

In one embodiment, a fuel tank system for use with a tractor of a tractor trailer truck or other heavy truck is provided. The fuel tank system includes at least one fuel tank and a support structure. The at least one fuel tank is provided proximate frame rail members of the tractor. At least a portion of the at least one fuel tank extends between an extension of a vertical axis of each of the frame rail members. The support structure protects the at least one fuel tank during an event, such as, but not limited to a collision, crash or accident.

In one embodiment, a fuel tank system for use with a heavy truck is provided. The fuel tank system includes at least one fuel tank and a support structure. The at least one fuel tank is provided proximate frame rail members of the truck. At least a portion of the at least one fuel tank extends between an extension of a vertical axis of each of the frame rail members. The support structure protects the at least one fuel tank during an event, such as, but not limited to a collision, crash or accident. The support structure includes at least one mounting member which attaches the at least one fuel tank to the frame rail members, at least one rail which extends about the at least one fuel tank, and at least one bottom plate.

In one embodiment, a fuel tank system for use with a heavy truck is provided. The fuel tank system includes a fuel tank and a support structure. The fuel tank is positioned proximate an underside of the heavy truck between a first side of the heavy truck and a second side of the heavy truck. The support structure, which protects the fuel tank during an event, such as, but not limited to a collision, crash or accident, includes at least one mounting member which attaches the fuel tank to the underside of the heavy truck, at least one rail which extends about the fuel tank, and at least one bottom plate.

In one embodiment, the fuel tanks are provided beneath the frame rail members of the vehicle. A support structure may be provided for support on each side of the vehicle which also acts as a guard for the tank. A bottom plate may also be provided to protect the tanks from intrusion from below and protect the tanks in the event of a front axle attachment failure and the resulting impact and ground contact. Additionally, a guard section may be positioned between the tanks to provide protection for the tanks in the event of a drive shaft or drive line failure.

The use of the support structure provides both impact and tearing protection for the tank. This support structure also allows mounting of other components such as exhaust, air tanks, and emission control systems to the outside of the structure. These mounted components will further act as energy absorbing members, further protecting the tank. The support structure also allows mounting of additional energy absorbing devices or structures as needed.

The bottom plate will protect the bottom of the tank from crush or puncture and serve as a skid plate if ground contact is made. The front edge of the bottom plate may be turned up to allow for protection to the front side of the tank or tanks. The bottom plate also provides a location for mounting and location hardware and brackets for the tank.

The support structure may be mounted to tank locating brackets attached to the bottom plate. This may be formed in a U-section with wings which will serve as tank retention brackets.

Additional protection may be provided by energy absorbing capabilities of accessories mounted outside of the tanks and energy absorbing brackets.

In one embodiment, the fuel lines are routed within the structure and the frame rails. The tanks would be filled from a tube routed out the rear side of the tanks and structure with an integrated check system in the tank to prevent in the event of failure of this hose.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
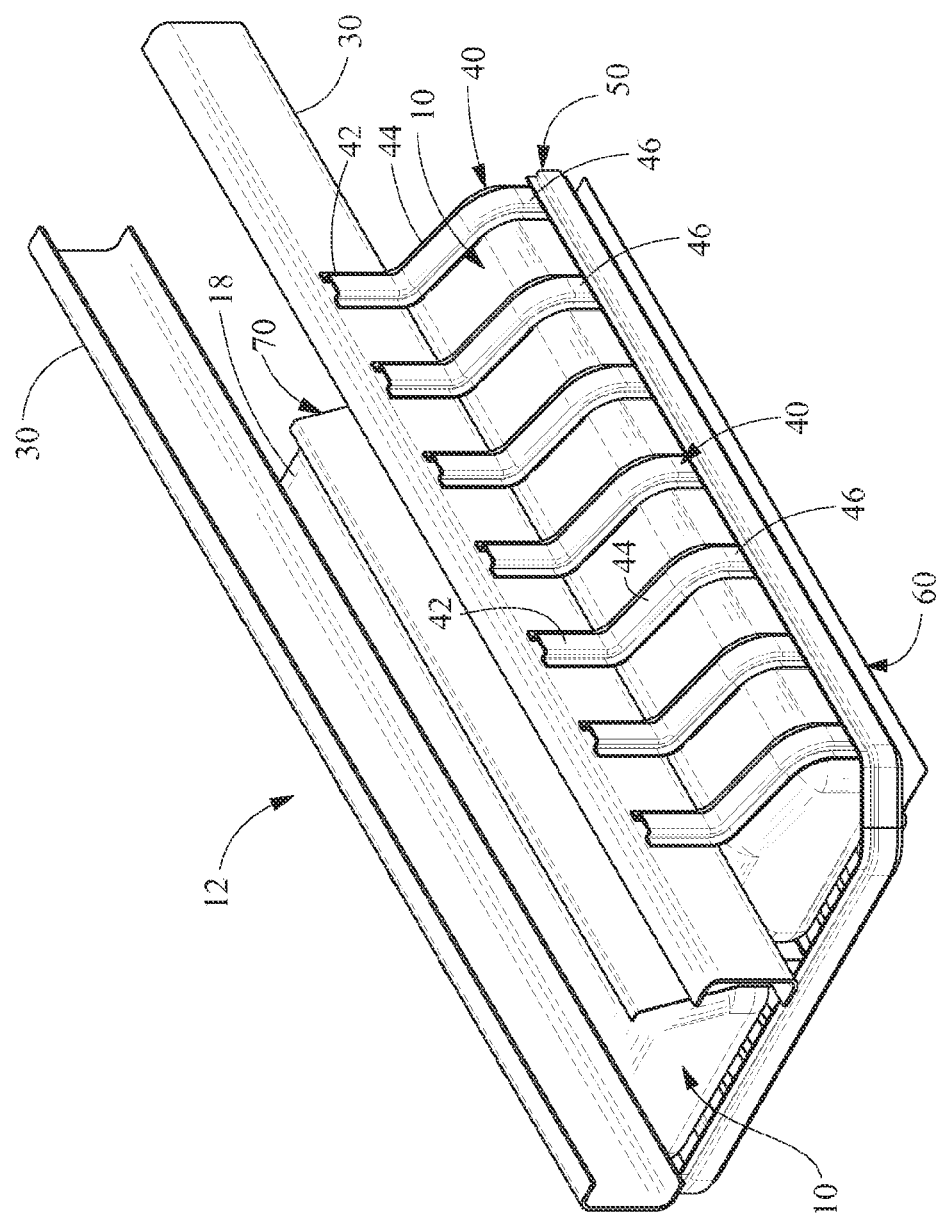
FIG. 1 is a perspective view of components of an illustrative embodiment of a fuel system according to the present invention.
Figure 2:
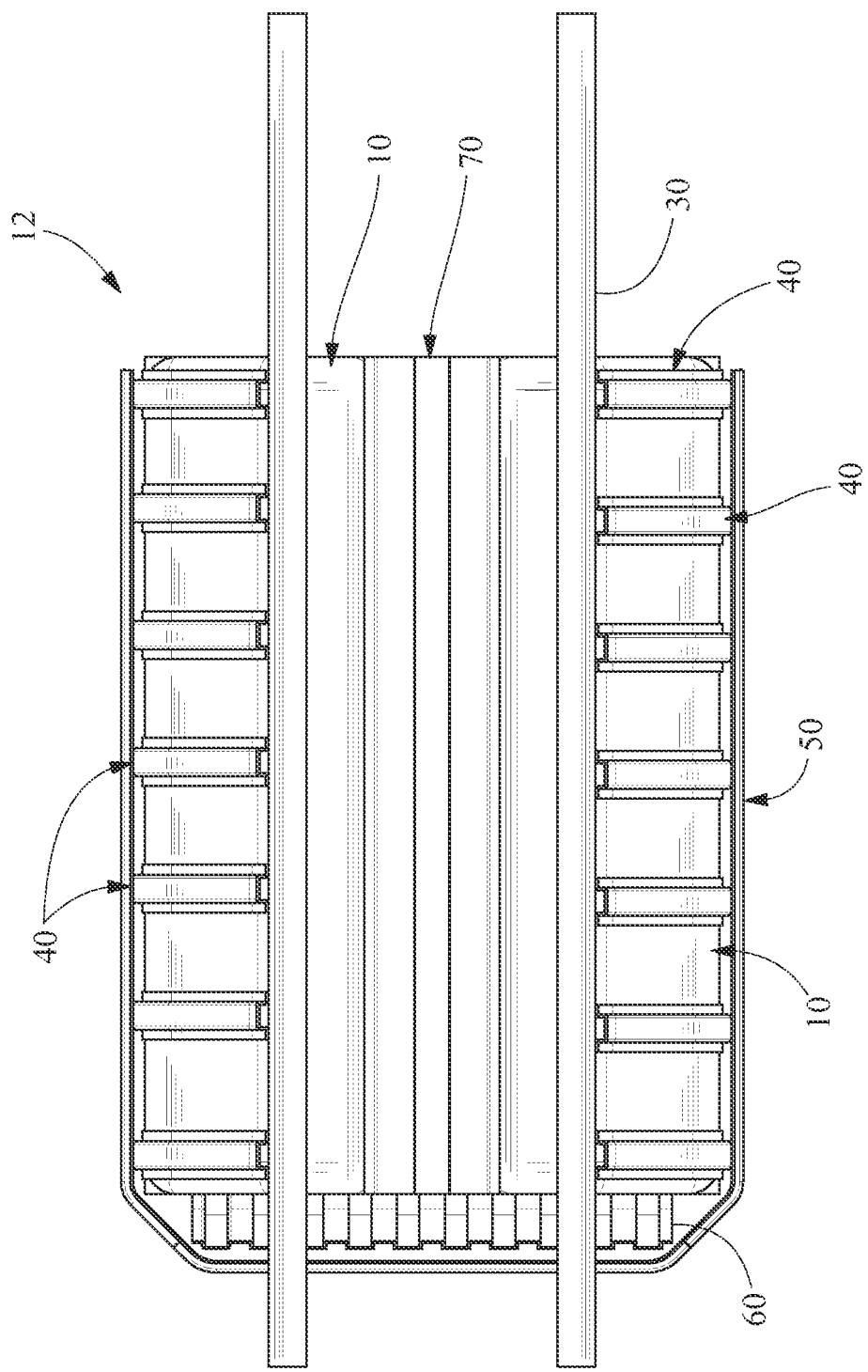
FIG. 2 is a top view of the fuel system of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

Referring now to the drawings wherein like reference characters refer to like and corresponding parts throughout the several views, there is shown in FIGS. 1 through 4, two fuel tanks 10 which are part of a fuel system 12 for a tractor of a tractor trailer truck or other heavy trucks or similar type vehicles. While two fuel tanks are shown, at least one fuel tank or other numbers of fuel tanks may be used without departing from the scope of the invention.

Each fuel tank 10 can be made in one piece, as shown in the drawings. Alternatively, the fuel tanks can be made using conventional methods, such as, but not limited to having a bottom pan member and a top pan member joined in any conventional manner, such as by a series of continuous welds which fasten together flanges of the bottom pan member and the top pan member. The material used to form the fuel tanks can be any material which will not degrade or fail when exposed to the fuel (i.e. diesel) which is stored in the fuel tanks 10, such as, but not limited to, polyethylene.

An inlet pipe or tube (not shown) is secured to the fuel tank 10, for example through a top wall 18 of the tank 10. The inlet tube may be secured to the fuel tank 10 in any known manner.

The inlet tube is for the purpose of introducing diesel or other desired fuel into the respective tank 10. The inlet tube may be secured to the fuel tank 10 at various locations, including, but not limited to, near the rearward end of the tank 10. A gasoline feed tube or pipe (not shown) extends from the fuel tank 10, for example through a bottom wall 22, for the purpose of feeding the fuel to the engine of the vehicle. The feed tube or pipe may be located at various locations, including, but not limited to, near the forward end of the tank 10.

Figure 3:
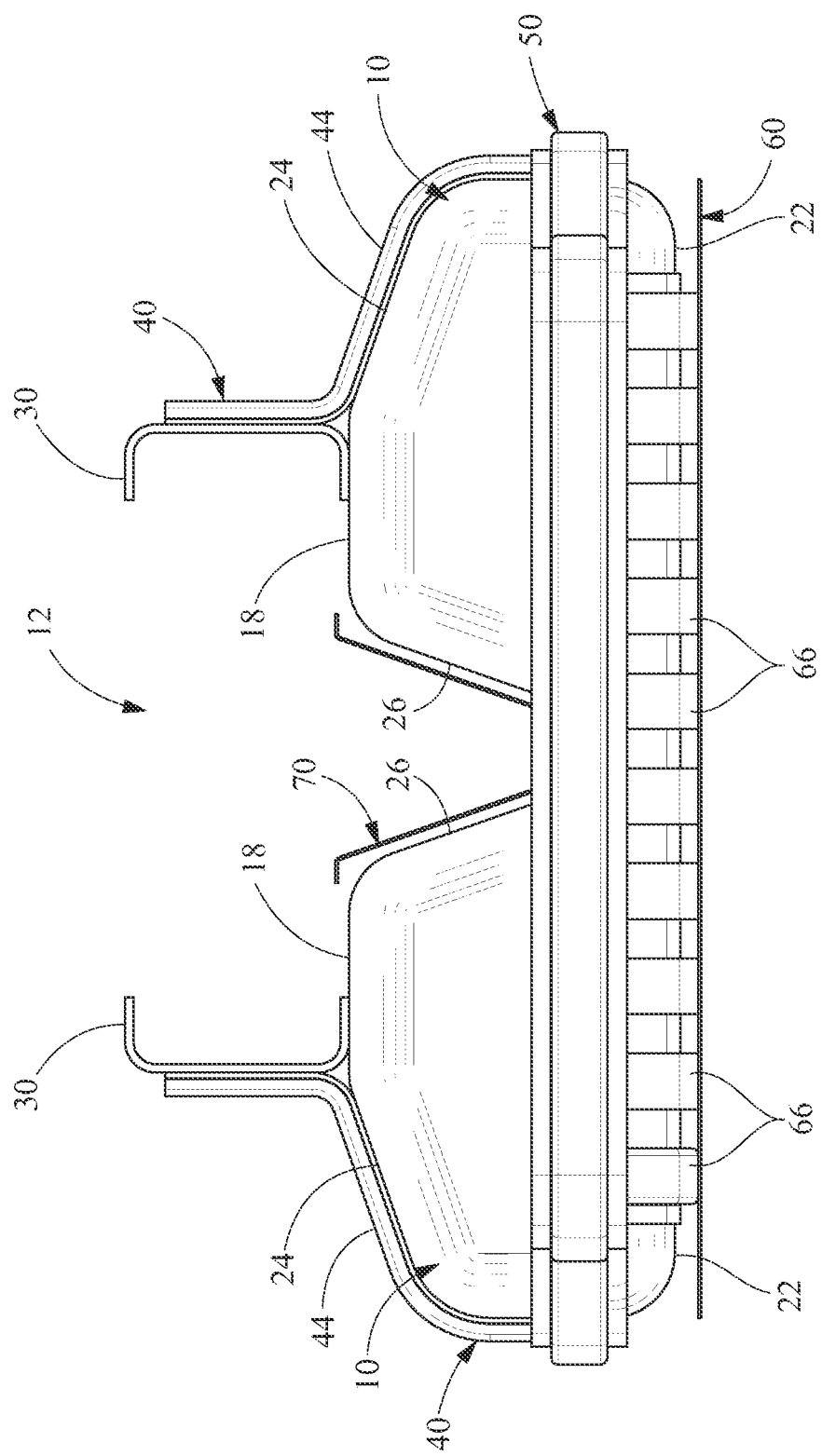
FIG. 3 is a front view of the fuel system of FIG. 1.
Figure 4:
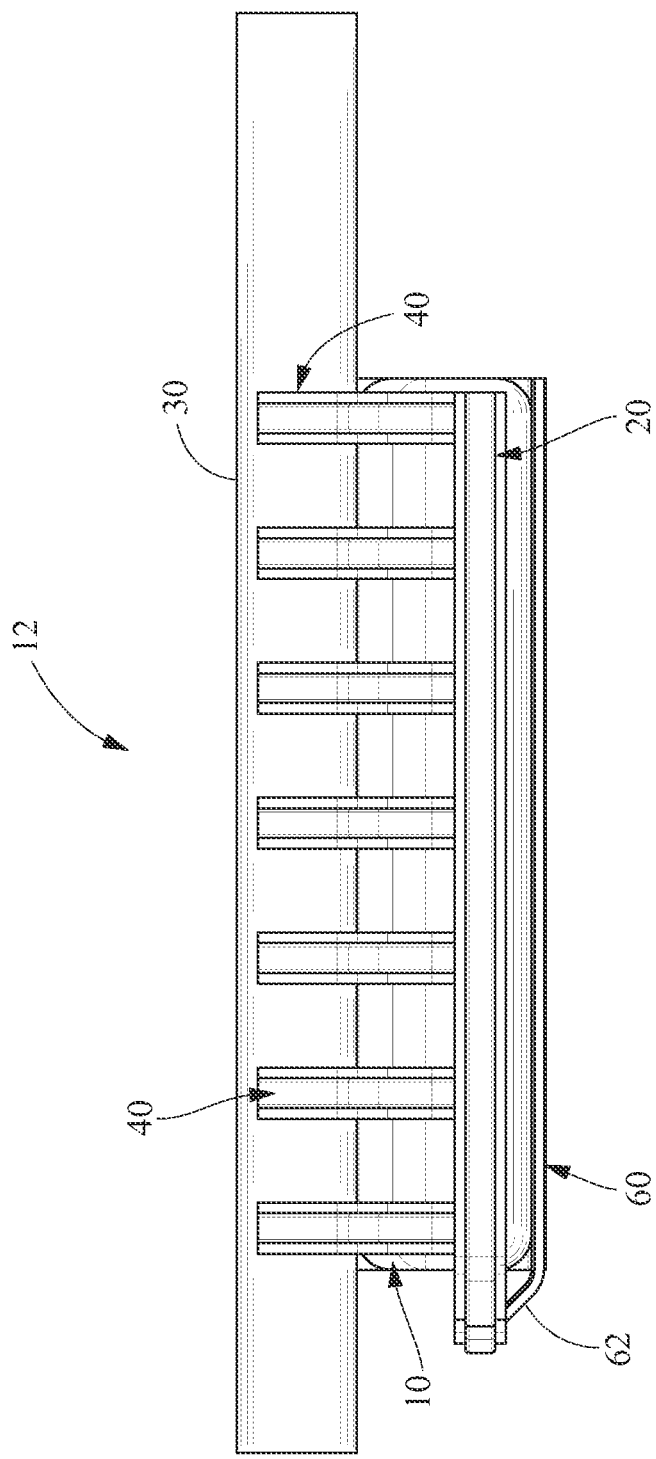
FIG. 4 is a side view of the fuel system of FIG. 1.

As best shown in FIGS. 1 and 3, the tanks 10 are adapted to be horizontally attached to the underside of the truck or vehicle so that the top walls 18 and the bottom walls 22 of the tanks are essentially parallel to the plane of the longitudinal axis of frame rail members 30 of the truck or motor vehicle and essentially parallel to the longitudinal axis of the drive shaft or drive line (not shown) of the vehicle. It should be understood that the cross section and overall shape of the fuel tanks 10 can be of any desired modification based on the space available for the tanks 10 and the desired capacity of the tank 10. In the embodiment shown in FIGS. 1 through 4, sloped walls 24, 26 (as best shown in FIG. 3) extend from top walls 18. Sloped walls 24 are dimensioned to cooperate with mounting members 40, as will be more fully described. Slope walls 26 are configured to allow the fuel tanks 10 to be installed about the drive shaft. This configuration of the sloped surfaces 24, 26 causes the fuel tanks 10 to be pushed downward, away from the drive shaft and away from the frame rail members 30, during an event, such as, but not limited to a collision, crash or accident. As any force is applied to the fuel tanks 10 during such an event, the sloped surfaces 24, 26 cause the applied forces to exhibit a partial downward force on the fuel tanks 10, causing the fuel tanks 10 to be moved away from the drive shaft.

As best shown in FIG. 1, the fuel system 12 includes the fuel tanks 10, mounting members 40, at least one rail 50 and at least one bottom plate 60. The mounting members 40 have an S-shaped configuration with a first end section 42, a middle section 44 and a second end section 46. The first end section 42 of each mounting member 40 is mounted to a respective frame member 30 of the vehicle using known mounting methods, such as, but not limited to bolting the first end section 42 to the frame 30. The second end section 46 of each mounting member 40 is mounted to a respective rail 50 using known mounting methods, such as, but not limited to bolting the second end section 46 to the rail 50. The second end section 46 of each mounting member 40 may also be mounted to the bottom plate 60 using known mounting methods, such as, but not limited to bolting the second end section 46 to the bottom plate 60. Alternatively, or additionally, the bottom plate 60 may be mounted to the rails 50 using known mounting methods, such as, but not limited to bolting the rails 50 to the bottom plate 60.

The mounting members 40 may have a nonlinear cross-section to provide additional strength to the mounting members 40, thereby enhancing the ability of the mounting members 40 to support additional weight and to provide additional crush resistance for the fuel tanks 10 The nonlinear configuration of the mounting members 40 allows for forces applied thereto to be better dissipated over the entire surface of the mounting members 40, thereby preventing lateral forces from being transferred directly to the fuel tanks 10 during an event, such as, but not limited to a collision, crash or accident. The mounting members 40 may be made from any material having the strength characteristics desired, including, but not limited to, steel and cross-linked polyethylene.

As best shown in FIG. 3, the middle section 44 is dimensioned to have a downward tilt, away from the frame members 30. In one embodiment, the angled of the downward tilt is approximately equal to the slope of the sloped wall 24. Consequently, as a lateral force is applied to the mounting members 40, the middle section 44 cooperates with the surface 24 causing the lateral force to be partially translated to a downward force, causing the fuel tanks 10 to be moved downward away from the frame members 30 and the drive shaft. In so doing, the fuel tank 10 is moved away from the drive shaft during an event, such as, but not limited to a collision, crash or accident, thereby preventing the fuel tanks 10 from being punctured by the drive shaft.

The spacing of the mounting members 40 along the fuel tanks 10 can be varied depending upon the capacity of the fuel tanks 10 and the amount of protection required to prevent puncture of the fuel tanks 10 during or as a result of an such an event. Alternatively, the mounting member 40 may be a solid member to provide enhanced protection.

As shown in FIG. 3, rails 50 may have a nonlinear cross-section to provide additional strength to the rails 50, thereby enhancing the ability of the rails 50 to provide additional integrity to the system 12 and to provide additional crush resistance for the fuel tanks 10. The nonlinear configuration of the rails 50 allows for forces applied thereto to be better dissipated over the entire surface of the rails 50, thereby preventing lateral forces from being transferred to the fuel tanks 10 during an event, such as, but not limited to a collision, crash or accident. The rails 50 may be made from any material having the strength characteristics desired, including, but not limited to, steel and cross-linked polyethylene.

In the illustrative embodiment, the bottom plate 60 extends below the entire width and length of the fuel tanks 10. As shown in FIG. 3, the bottom plate 60 may have a nonlinear cross-section to provide additional strengthening ribs 66 to the bottom plate 60, thereby enhancing the ability of the bottom plate 60 to provide additional integrity to the system 12 and to provide additional crush resistance for the fuel tanks 10. The nonlinear configuration of the bottom plate 60 allows for forces applied thereto to be better dissipated over the entire surface of the bottom plate 60, thereby preventing damaging forces from being transferred to the fuel tanks 10 during such an event. The bottom plate 60 may be made from any material having the strength characteristics desired, including, but not limited to, steel and cross-linked polyethylene. The strengthening ribs 66 may be space periodically along the bottom plate 60 or may be more uniformly distributed, depending upon the material used for the bottom plate 60 and the strength characteristics desired.

The bottom plate 60 protects the fuel tanks 10 from intrusion from below and protects the fuel tanks 10 in the event of a front axle attachment failure and the resulting impact and ground contact. The bottom plate 60 protects the bottom of the fuel tanks 10 from being crushed or punctured and serves as a skid plate if ground contact is made. A front edge 62 (FIG. 4) of the bottom plate 60 may be turned up to allow for protection to the front side of the fuel tanks 10. The bottom plate 60 also provides a location for conventional mounting and location hardware and brackets to mount the fuel tanks 10 to the bottom plate 60. The mounting members 40 may also be mounted to the tank locating brackets attached to the bottom plate 60. In one embodiment, the tank locating bracket may be formed in a U-section with wings which serve as tank retention brackets.

A guard 70 (FIG. 1) may be positioned between the fuel tanks 10 to provide protection for the tanks 10 in the event of a drive shaft failure. The guard may be made from any material having the strength characteristics desired, including, but not limited to, steel and cross-linked polyethylene.

An alternate illustrative embodiment is shown in FIGS. 5 through 9. In this embodiment, a single fuel tank 110 is shown. While one fuel tank is shown in the system 112, other numbers of fuel tanks may be used without departing from the scope of the invention. As one illustrative option, the fuel tanks may be modular, allowing the appropriate number of tanks to be used to accommodate the desired fuel capacity. The material used to form the fuel tanks can be any material which will not degrade or fail when exposed to the fuel (i.e. diesel) which is stored in the fuel tank 110, such as, but not limited to, polyethylene.

Figure 6:
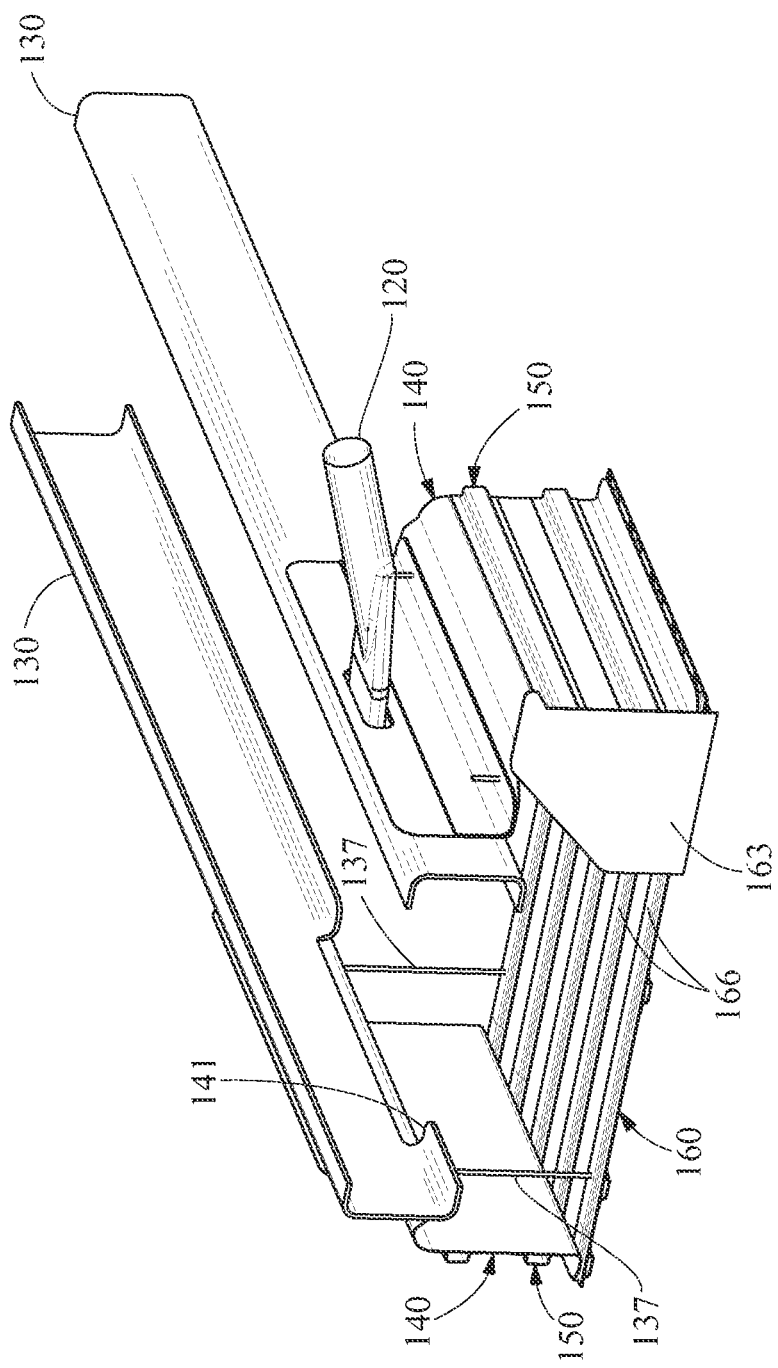
FIG. 6 is a perspective view of the components of the alternate illustrative embodiment of a fuel system shown in FIG. 5 with the fuel tanks removed and both of the vehicle frame rail members shown.
Figure 7:
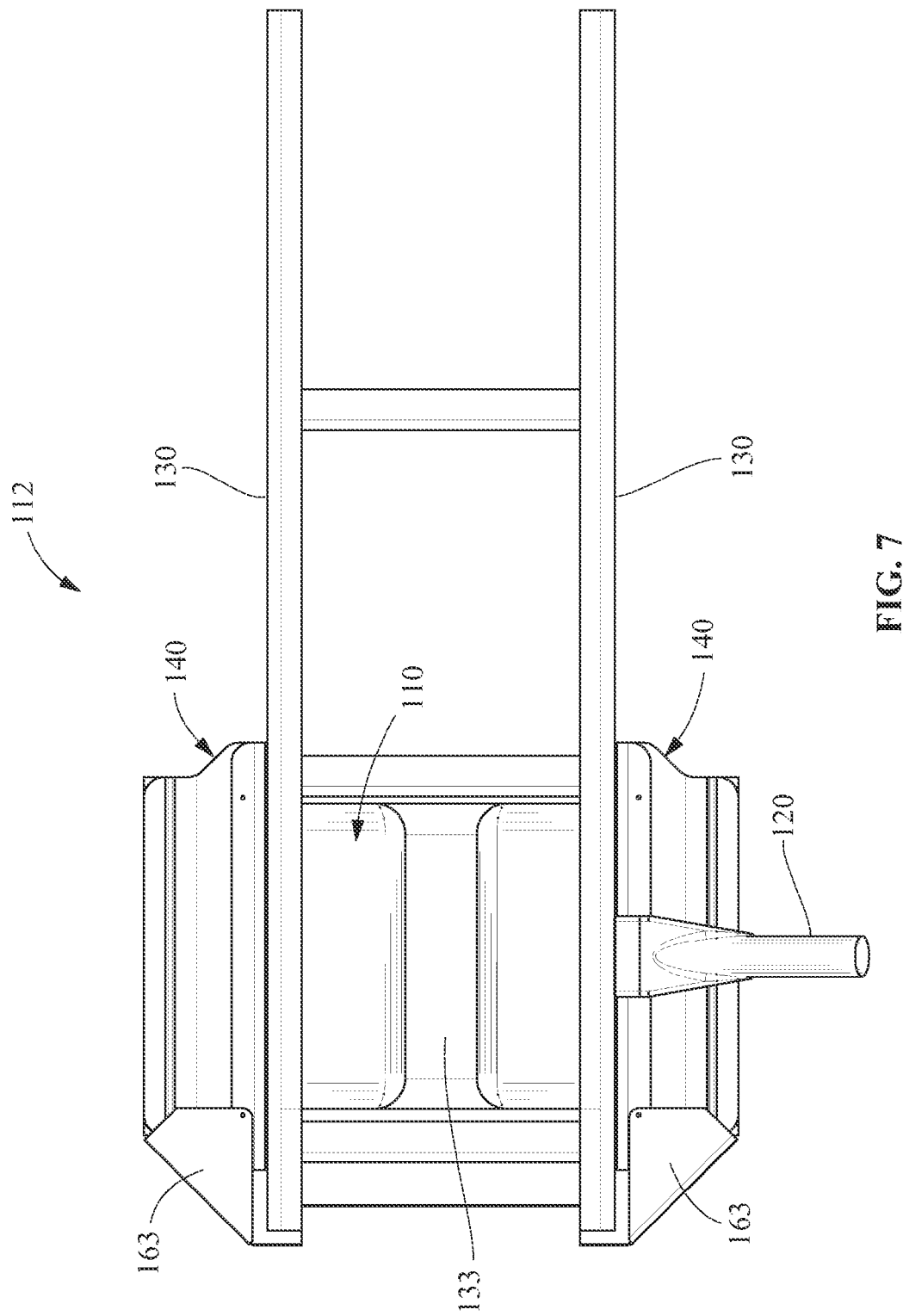
FIG. 7 is a top view of the fuel system of FIG. 5, with both of the vehicle frame rail members shown.

An inlet pipe or tube 120 is secured to the fuel tank 10, for example through a side wall 119 of the tank 110. The inlet tube may be secured to the fuel tank 110 in any known manner. The inlet tube is for the purpose of introducing diesel or other desired fuel into the respective tank 10. The inlet tube may be secured to the fuel tank 10 at various locations, including, but not limited to, near the rearward end of the tank 10. As shown in FIG. 6, openings may be provided through the rail frame members 130 and the mounting member 140 to allow the inlet pipe 120 to access the tank 110. A gasoline feed tube or pipe (not shown) extends from the fuel tank 10, for example through a bottom wall 122, for the purpose of feeding the fuel to the engine of the vehicle. The feed tube or pipe may be located at various locations, including, but not limited to, near the forward end of the tank 110.

Figure 5:
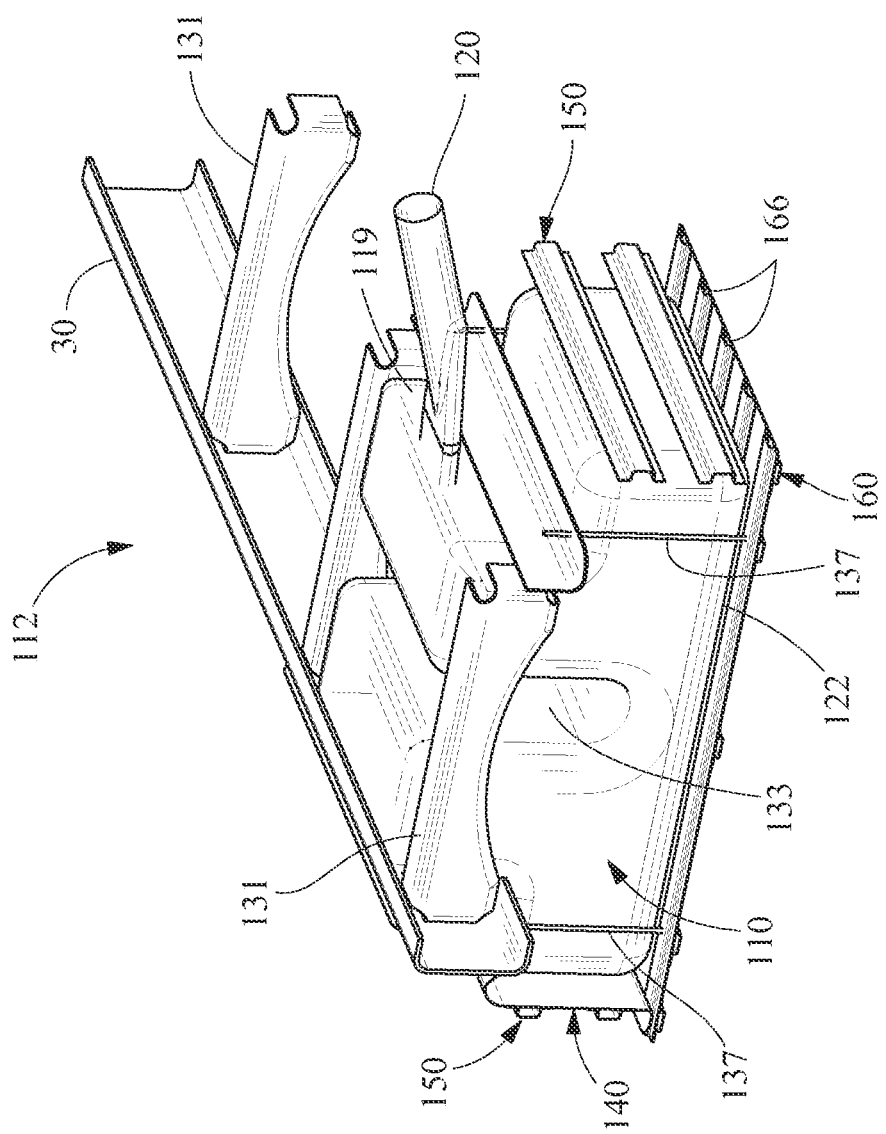
FIG. 5 is a front perspective view of components of an alternate illustrative embodiment of a fuel system according to the present invention, with one of the vehicle frame rail members removed.
Figure 8:
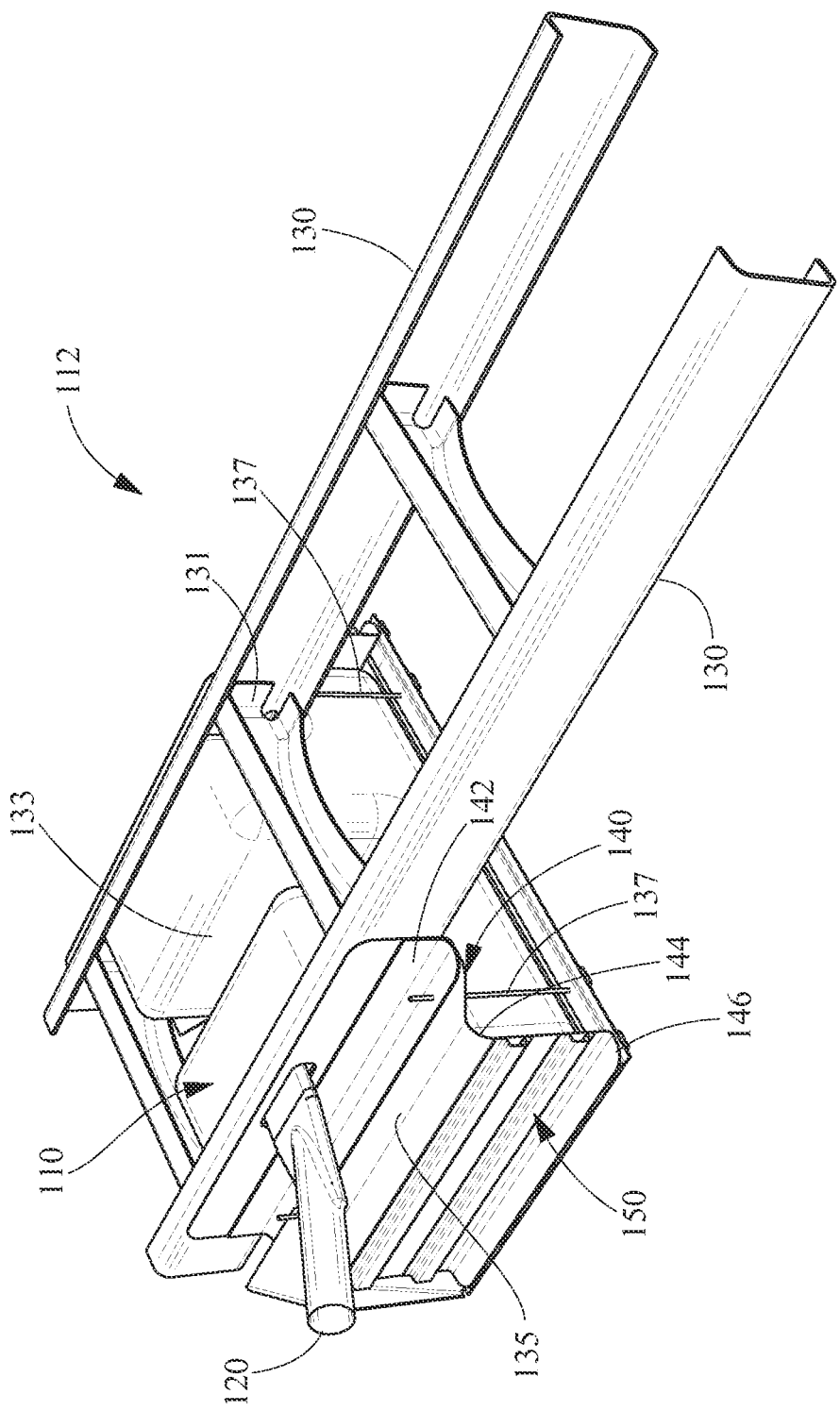
FIG. 8 is a back perspective view of the fuel system of FIG. 5, with both of the vehicle frame rail members shown.

As best shown in FIGS. 5 and 8, the tanks 110 are adapted to be horizontally attached to the underside of the truck or vehicle so that portions 121 of the tanks 110 are positioned between the frame rail members 130 and cross supports 131 of the truck or motor vehicle. A channel 133 is provided to accommodate the drive shaft or drive line (not shown) of the vehicle. It should be understood that the cross section and overall shape of the fuel tank 110 can be of any desired modification based on the space available for the tank 110 and the desired capacity of the tank 10. In the embodiment shown, the rail frame members 130 are notched at 141 (as shown in FIG. 6) to allow for the tank 110 to be positioned between the rail frame members 130. When mounted to the rail frame members 130, the combination of the mounting members 140, rails 150 and bottom plate 160 provide additional strength to the rail frame members 130 to compensate for any weakness to the rail frame members 130 caused by the notches 141.

The fuel system 112 includes the fuel tank 110, mounting members 140, at least one rail 150 and at least one bottom plate 160. As best shown in FIG. 8, the mounting members 140 have an S-shaped configuration with a first end section 142, a middle section 144 and a second end section 146. The first end section 142 of each mounting member 140 is mounted to a respective frame member 130 of the vehicle using known mounting methods, such as, but not limited to bolting the first end section 142 to the frame 130. The second end section 146 of each mounting member 140 is mounted to the bottom plate 160 using known mounting methods, such as, but not limited to bolting the second end section 146 to the bottom plate 160. The second end section 146 of each mounting member 140 may also be mounted to a respective rail 150 using known mounting methods, such as, but not limited to bolting the second end section 146 to the rail 150. Alternatively, or additionally, the bottom plate 160 may be mounted to the rails 150 using known mounting methods, such as, but not limited to bolting the rails 150 to the bottom plate 160.

As best shown in FIG. 8, the middle section 44 is dimensioned to have a flange 135 which extends away from the frame members 130. Extending from the flange 135 to the bottom plate 160 are one or more support members or struts 137. The support members or struts 137 provide additional support to the system 112 and maintain the bottom plate 160 in position relative to the rail frame members 130 during normal operation. However, in case of an event, such as, but not limited to a collision, crash or accident, the support members or struts 137 are designed to fail, causing the bottom plate 160 and the fuel tank 110 to be fall downward away from the frame members 130 and the drive shaft. In so doing, the fuel tank 110 is moved away from the drive shaft during such an event, thereby preventing the fuel tank 110 from being punctured by the drive shaft.

In the embodiment shown, each mounting member 140 is one piece which extends along the entire side of the fuel tank 110. However, the configuration of the mounting members 140 can be varied depending upon the capacity of the fuel tank 110 and the amount of protection required to prevent puncture of the fuel tank 110 during or as a result of such an event. For example, the mounting members 40 may be individual members rather than a solid member (similar to that shown in FIGS. 1 through 4).

As shown in FIGS. 5, 6 and 8, rails 150 may have a nonlinear cross-section to provide additional strength to the rails 150, thereby enhancing the ability of the rails 150 to provide additional integrity to the system 112 and to provide additional crush resistance for the fuel tank 110. The nonlinear configuration of the rails 150 allows for forces applied thereto to be better dissipated over the entire surface of the rails 150, thereby preventing lateral forces from being transferred to the fuel tanks 110 during such an event. The rails 150 may be made from any material having the strength characteristics desired, including, but not limited to, steel and cross-linked polyethylene.

In the illustrative embodiment, the bottom plate 160 extends below the entire width and length of the fuel tank 110. As shown in FIG. 6, the bottom plate 160 may have a nonlinear cross-section to provide additional strengthening ribs 166 to the bottom plate 160, thereby enhancing the ability of the bottom plate 160 to provide additional integrity to the system 112 and to provide additional crush resistance for the fuel tank 110. The nonlinear configuration of the bottom plate 160 allows for forces applied thereto to be better dissipated over the entire surface of the bottom plate 160, thereby preventing damaging forces from being transferred to the fuel tank 110 during an event, such as, but not limited to a collision, crash or accident. The bottom plate 160 may be made from any material having the strength characteristics desired, including, but not limited to, steel and cross-linked polyethylene. The strengthening ribs 166 may be space periodically along the bottom plate 160 or may be more uniformly distributed, depending upon the material used for the bottom plate 160 and the strength characteristics desired.

The bottom plate 160 protects the fuel tank 110 from intrusion from below and protects the fuel tank 110 in the event of a front axle attachment failure and the resulting impact and ground contact. The bottom plate 160 protects the bottom of the fuel tank 110 from being crushed or punctured and serves as a skid plate if ground contact is made. One or more front plates 163 (FIG. 3) may be attached or integral to the bottom plate 160 and or the mounting members 140 and or the rails 150 may be provided to allow for additional protection to the front side of the fuel tank 110. The bottom plate 60 also provides a location for conventional mounting and location hardware and brackets to mount the fuel tank 110 to the bottom plate 160. The mounting members 140 may also be mounted to the tank locating brackets attached to the bottom plate 160. In one embodiment, the tank locating bracket may be formed in a U-section with wings which serve as tank retention brackets.

A guard (not shown, but similar to that shown in FIGS. 1 through 4) may be positioned in the channel 133 to provide protection for the tank 110 in the event of a drive shaft failure. The guard may be made from any material having the strength characteristics desired, including, but not limited to, steel and cross-linked polyethylene.

As shown in the illustrative embodiments of FIGS. 1-8, the frame members 30, mounting members 40, rails 50 and the bottom plate 60 form a protective area, cage or support area which provides a crush-free zone for the fuel tank(s) 10. The support structure may be provided for support on each side of the vehicle which also acts as a guard for the fuel tank. The use of the support structure provides both impact and tearing protection for the fuel tank(s) 10. This support structure also allows mounting of other components such as exhaust, air tanks, and emission control systems to the outside of the structure. These mounted components will further act as energy absorbing members, further protecting the fuel tanks. The support structure also allows mounting of additional energy absorbing devices or structures as needed.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A fuel tank system for use with a tractor of a tractor trailer truck or other heavy truck, the fuel tank system comprising:
    at least one fuel tank provided proximate frame rail members of the tractor, a first portion of the at least one fuel tank extending between an extension of a vertical axis of each of the frame rail members and a second portion of the at least one fuel tank extending outside the space defined by the vertical axes of the frame rail members;
    a support structure which protects the at least one fuel tank during an impact, the support structure including mounting members and rails mounted to the mounting members, the mounting members being mounted to the frame rail members; and
    the rails having a nonlinear cross-section to provide additional strength to the rails which provides integrity to the system and provides crush resistance for the at least one fuel tank, the nonlinear cross-section of the rails allowing for forces applied to the rails to be dissipated over a surface of the rails, thereby protecting the at least one fuel tank from impact forces during the impact;

wherein the at least one fuel tank is disposed below a top side of the frame rail members and is adapted to be horizontally positioned relative to the underside of the tractor, such that a top wall of the at least one fuel tank and a bottom wall of the at least one fuel tank are essentially parallel to a horizontal plane of a longitudinal axis of the frame rail members of the tractor and essentially parallel to a longitudinal axis of a drive shaft of the tractor.

2. The fuel tank system of claim 1, wherein the mounting members have an S-shaped configuration with a first end section, a middle section and a second end section, the first end sections are mounted to the frame rail members.

3. The fuel tank system of claim 1, wherein the rails extend about the at least one fuel tank and at least one bottom plate.

4. The fuel tank system of claim 3, wherein the mounting members are mounted to the at least one bottom plate.

5. The fuel tank system of claim 3, wherein the at least one bottom plate is mounted to the rails.

6. The fuel tank system of claim 3, wherein the frame rail members, the mounting members, the rails and the at least one bottom plate form a protective area which provides a crush-free zone for the at least one fuel tank, providing both impact and tearing protection for the at least one fuel tank.

7. The fuel tank system of claim 3, wherein the at least one bottom plate has a leading edge which is turned up to allow for protection of the at least one fuel tank.

8. The fuel tank system of claim 1, wherein support members connects the mounting members to the at least one bottom plate, the support members configured to fail during the event, allowing the at least one fuel tank to be moveable relative to the tractor during the impact.

9. The fuel tank system of claim 1, wherein the at least one fuel tank has sloped walls extending from the top wall, the sloped walls allow the at least one fuel tank to be installed proximate the drive shaft of the tractor, the sloped walls cause the at least one fuel tank to be pushed downward, away from the drive shaft during the impact, as a force applied to the sloped walls of the at least one fuel tank during the impact causes the force applied to exhibit a partial downward force on the at least one fuel tank, causing the at least one fuel tank to be moved away from the drive shaft.

10. The fuel tank system of claim 9, wherein a guard is positioned between the at least one fuel tank and the drive shaft to provide protection for the at least one fuel tank in an event of a failure of the drive shaft.

11. The fuel tank system of claim 1, wherein the at least one fuel tank has curved outer walls, the mounting members configured to match the curvature and cooperate with the curved outer walls.

12. The fuel tank system of claim 1, wherein longitudinal axes of the rails are parallel to longitudinal axes of the frame rail members.

13. The fuel tank system of claim 12, wherein the rails are disposed about outer walls of the at least one fuel tank.

14. The fuel tank system of claim 1, wherein respective mounting members are positioned on either side of the at least one fuel tank, each respective mounting member being a one piece member which extends along an entire side of the at least one fuel tank.

15. A fuel tank system for use with a heavy truck, the fuel tank system comprising:
at least one fuel tank provided proximate frame rail members of the truck, at least a portion of the at least one fuel tank extending between an extension of a vertical axis of each of the frame rail members; and
a support structure which protects the at least one fuel tank during an impact, the support structure including mounting members which attach the at least one fuel tank to the frame rail members, rails which are positioned on respective opposing sides of the at least one fuel tank, and at least one bottom plate;
respective mounting members positioned on either side of the at least one fuel tank, each respective mounting member being a one piece member which extends along an entire side of the at least one fuel tank;
the rails having a nonlinear cross-section allowing for forces applied to the rails to be dissipated over a surface of the rails, thereby protecting the at least one fuel tank from lateral impact forces during the impact;
the at least one bottom plate having a nonlinear cross-section allowing for forces applied to the at least one bottom plate to be dissipated over a surface of the at least one bottom plate, thereby protecting the at least one fuel tank during the impact.

16. The fuel tank system of claim 15, wherein the at least one fuel tank has sloped walls extending from a top wall, the sloped walls allow the at least one fuel tank to be installed proximate a drive shaft of the truck, the sloped walls cause the at least one fuel tank to be pushed downward, away from the drive shaft during the impact, as a force applied to the sloped walls of the at least one fuel tank during the impact causes the force applied to exhibit a partial downward force on the at least one fuel tank, causing the at least one fuel tank to be moved relative to the truck during the impact.

17. The fuel tank system of claim 15, wherein a guard is positioned between the at least one fuel tank and a drive shaft of the truck to provide protection for the at least one fuel tank in an event of a failure of the drive shaft.

18. The fuel tank system of claim 15, wherein the at least one fuel tank is adapted to be horizontally attached to the underside of the truck, such that a top wall of the at least one fuel tank and a bottom wall of the at least one fuel tank are essentially parallel to a horizontal plane of a longitudinal axis of the frame rail members of the truck and essentially parallel to a longitudinal axis of a drive shaft of the truck.

19. The fuel tank system of claim 15, wherein at least one support member connects the at least one mounting member to the at least one bottom plate, the support member configured to fail during the impact, causing the at least one bottom plate and the at least one fuel tank move relative to the frame rail members and a drive shaft.

20. The fuel tank system of claim 15, wherein the at least one fuel tank has curved outer walls, the mounting members configured to match the curvature and cooperate with the curved outer walls.

21. The fuel tank system of claim 15, wherein the rails are mounted to the mounting members, longitudinal axes of the rails are parallel to longitudinal axes of the frame rail members.

22. The fuel tank system of claim 21, wherein the rails are disposed about outer walls of the at least one fuel tank.

23. A fuel tank system for use with a heavy truck, the fuel tank system comprising:
a fuel tank positioned proximate an underside of the heavy truck, the fuel tank positioned between a first side of the heavy truck and a second side of the heavy truck;
a support structure which protects the fuel tank during an impact, the support structure including mounting members which attaches the fuel tank to the underside of the heavy truck, rails which are positioned on respective opposing sides of the fuel tank, and at least one bottom plate;

respective mounting members positioned on either side of the fuel tank, each respective mounting member being a one piece member which extends along an entire side of the fuel tank; and the rails having a nonlinear cross-section allowing for forces applied to the rails to be dissipated over a surface of the rails to protect the fuel tank during the impact.

24. The fuel tank system of claim 23, wherein the fuel tank has curved outer walls, the mounting members configured to match the curvature and cooperate with the curved outer walls.

25. The fuel tank system of claim 23, wherein the rails are mounted to the mounting members, longitudinal axes of the rails are parallel to longitudinal axes of the frame rail members.

26. The fuel tank system of claim 25, wherein the rails are disposed about outer walls of the fuel tank.

27. A fuel tank system for use with a tractor of a tractor trailer truck or other heavy truck, the fuel tank system comprising:

at least one fuel tank provided proximate frame rail members of the tractor, a first portion of the at least one fuel tank extending between an extension of a vertical axis of each of the frame rail members and a second portion of the at least one fuel tank extending outside the space defined by the vertical axes of the frame rail members;

a support structure which protects the at least one fuel tank during an impact, the support structure including mounting members and rails mounted to the mounting members, the mounting members being mounted to the frame rail members;

the at least one fuel tank has curved outer walls, the mounting members configured to match the curvature and cooperate with the curved outer walls; and the rails having a nonlinear cross-section to provide additional strength to the rails which provides integrity to the system and provides crush resistance for the at least one fuel tank, the nonlinear cross-section of the rails allowing for forces applied to the rails to be dissipated over a surface of the rails, thereby protecting the at least one fuel tank from impact forces during the impact.

28. A fuel tank system for use with a tractor of a tractor trailer truck or other heavy truck, the fuel tank system comprising:

at least one fuel tank provided proximate frame rail members of the tractor, a first portion of the at least one fuel tank extending between an extension of a vertical axis of each of the frame rail members and a second portion of the at least one fuel tank extending outside the space defined by the vertical axes of the frame rail members;

a support structure which protects the at least one fuel tank during an impact, the support structure including mounting members and rails mounted to the mounting members, the mounting members being mounted to the frame rail members;

respective mounting members are positioned on either side of the at least one fuel tank, each respective mounting member being a one piece member which extends along an entire side of the at least one fuel tank; and the rails having a nonlinear cross-section to provide additional strength to the rails which provides integrity to the system and provides crush resistance for the at least one fuel tank, the nonlinear cross-section of the rails allowing for forces applied to the rails to be dissipated over a surface of the rails, thereby protecting the at least one fuel tank from impact forces during the impact.

* * * * *